US008600524B2

(12) United States Patent
Law et al.

(10) Patent No.: US 8,600,524 B2
(45) Date of Patent: Dec. 3, 2013

(54) STATE MACHINE FUNCTION BLOCK WITH A USER MODIFIABLE STATE TRANSITION CONFIGURATION DATABASE

(75) Inventors: Gary K. Law, Georgetown, TX (US); Michael G. Ott, Austin, TX (US); Kent A. Burr, Round Rock, TX (US); Godfrey R. Sherriff, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 192 days.

(21) Appl. No.: 12/767,534

(22) Filed: Apr. 26, 2010

(65) Prior Publication Data

US 2011/0270418 A1 Nov. 3, 2011

Related U.S. Application Data

(62) Division of application No. 10/656,005, filed on Sep. 5, 2003, now Pat. No. 7,730,415.

(51) Int. Cl.
*G05B 11/01* (2006.01)

(52) U.S. Cl.
USPC .......................................... 700/12; 718/100

(58) Field of Classification Search
USPC ............... 700/12; 715/723, 771, 866; 716/18; 717/100; 718/100
See application file for complete search history.

(56) References Cited

U.S. PATENT DOCUMENTS

| 4,607,256 A | 8/1986 | Henzel |
| 5,357,420 A | 10/1994 | Gohl |
| 5,530,643 A | 6/1996 | Hodorowski |
| 5,576,946 A | 11/1996 | Bender et al. |
| 5,768,119 A | 6/1998 | Havekost et al. |
| 5,818,736 A | 10/1998 | Leibold |
| 5,838,563 A | 11/1998 | Dove et al. |
| 5,845,063 A | 12/1998 | Khrapunovich et al. |
| 5,903,886 A | 5/1999 | Heimlich et al. |

(Continued)

FOREIGN PATENT DOCUMENTS

| GB | 2 394 563 | 4/2004 |
| GB | 2 405 705 | 3/2005 |

(Continued)

OTHER PUBLICATIONS

"A structured approach to the specification and implementation of Cause & Effect application logic in safety related PLCs," TUV Rheinland, 4th International Symposium, PLCs in Safety Related Applications, Cologne, May 3-4, 2000.

(Continued)

*Primary Examiner* — Sean P. Shechtman
*Assistant Examiner* — Chad Rapp

(57) ABSTRACT

A control system, a safety system, etc., within a process plant may each use one or more state machine function blocks that can be easily integrated into a function block diagram programming environment. Such a state machine function block may include one or more inputs, which may cause astute machine implemented by the state machine function block to change states. The state machine function block may determine a next state to which it is to transition based, at least in part, on data indicative of the next state to which to transition, if any. The configuration data may be retrieved from a database based on the current state of the state machine and at least one of the inputs. The state machine function block may also include one or more outputs that are generated based on the state of the state machine.

22 Claims, 13 Drawing Sheets

(56) References Cited

U.S. PATENT DOCUMENTS

| | | | |
|---|---|---|---|
| 5,909,643 | A | 6/1999 | Aihara et al. |
| 5,959,859 | A | 9/1999 | Maruyama |
| 6,029,181 | A | 2/2000 | Milakovich et al. |
| 6,078,320 | A | 6/2000 | Dove et al. |
| 6,157,864 | A | 12/2000 | Schwenke et al. |
| 6,239,800 | B1 | 5/2001 | Mayhew et al. |
| 6,263,255 | B1 | 7/2001 | Tan et al. |
| 6,327,510 | B1 | 12/2001 | Yoshida et al. |
| 6,369,836 | B1 | 4/2002 | Larson et al. |
| 6,442,512 | B1 | 8/2002 | Sengupta et al. |
| 6,489,971 | B1 | 12/2002 | Miller et al. |
| 6,505,341 | B1 | 1/2003 | Harris et al. |
| 6,526,566 | B1 | 2/2003 | Austin |
| 6,577,323 | B1 | 6/2003 | Jamieson et al. |
| 6,665,648 | B2 | 12/2003 | Brodersen et al. |
| 6,668,203 | B1 | 12/2003 | Cook et al. |
| 6,834,370 | B1 | 12/2004 | Brandl et al. |
| 6,865,429 | B1 | 3/2005 | Schneider et al. |
| 6,901,560 | B1 | 5/2005 | Guerlain et al. |
| 6,915,235 | B2 | 7/2005 | Reeves et al. |
| 6,931,288 | B1 | 8/2005 | Lee et al. |
| 6,954,724 | B2 | 10/2005 | Kodosky et al. |
| 7,269,468 | B2 | 9/2007 | Law et al. |
| 7,290,244 | B2 | 10/2007 | Peck et al. |
| 7,730,415 | B2 | 6/2010 | Law et al. |
| 2002/0059054 | A1 | 5/2002 | Bade et al. |
| 2002/0120921 | A1 | 8/2002 | Coburn et al. |
| 2002/0144212 | A1 | 10/2002 | Lev et al. |
| 2002/0194218 | A1 | 12/2002 | Klapper et al. |
| 2003/0135533 | A1 | 7/2003 | Cook |
| 2003/0140039 | A1 | 7/2003 | Ferguson et al. |
| 2003/0144746 | A1 | 7/2003 | Hsiung et al. |
| 2003/0167265 | A1 | 9/2003 | Corynen |
| 2003/0195731 | A1 | 10/2003 | Kodosky et al. |
| 2004/0128120 | A1 | 7/2004 | Coburn et al. |
| 2005/0159922 | A1 | 7/2005 | Hsiung et al. |
| 2005/0278670 | A1 | 12/2005 | Brooks et al. |
| 2006/0136570 | A1 | 6/2006 | Pandya |
| 2006/0206866 | A1 | 9/2006 | Eldrige et al. |
| 2007/0282585 | A1 | 12/2007 | Szpak et al. |
| 2007/0282586 | A1 | 12/2007 | Szpak et al. |

FOREIGN PATENT DOCUMENTS

| | | |
|---|---|---|
| JP | 61-253503 | 11/1986 |
| JP | 63-293604 | 11/1988 |
| JP | 01-019170 A | 1/1989 |
| JP | 4-232553 | 8/1992 |
| JP | 5-346810 | 12/1993 |
| JP | 6-314117 | 11/1994 |
| JP | 2001-022412 | 1/2001 |
| JP | 2002-006909 | 1/2002 |
| JP | 2003-177804 | 6/2003 |
| WO | WO-03/003235 | 1/2003 |
| WO | WO-03/092044 | 11/2003 |

OTHER PUBLICATIONS

"IEC 61131-3: A Standard Programming Resource;" available at http:www.plcopen.org/into__iec.htm, printed May 15, 2003.

"QUADLOG Safety Matrix," Moore Process Automation Solutions, 6 pages, available at http://www.sea.siemens.com/process/docs/piql-16.pdf, Dec. 1998.

"Safety Life Cycle Management with Cause and Effect Matrix Tools," William M. Goble and John A. Cusimano, Dec. 31, 1969, Summary found on the web at http://searchpdf.adobe.com/proxies/1/63/15/8.html.

CEM Programming Language Editor; available at http://www.triconex.com, printed Jun. 3, 2003.

Control Engineering .online, "Simplified Safety System Programming," Sep. 1, 2000; available at http://manufacturing.net/ctl/index.asp?layout=article&article=CA211671 printed Jun. 3, 2003.

Examination Report for Application No. GB0724070.8, dated Jan. 21, 2008.

Notice of the Reasons of Rejection for Japanese Application No. 2004-257939, dated May 19, 2010.

Search Report under Section 17(5) issued in GB0419583.0 application by the United Kingdom Patent Office on Nov. 26, 2004.

U.S. Appl. No. 09/707,580 entitled "Integrated Alarm Display in a Process Control Network," which was filed Nov. 7, 2000.

U.S. Appl. No. 10/401,655 entitled "Function Block Implementation of a Cause and Effect Matrix for Use in a Process Safety System," which was filed Mar. 28, 2003.

Office Action for corresponding Chinese Application No. 10068672.2, dated May 20, 2008.

English-language text of Second Chinese Office Action for Application No. 200410068672.2, dated Nov. 22, 2008.

English-language text of Third Chinese Office Action for Application No. 200410068672.2, dated Jan. 2, 2010.

English-language text of Fourth Chinese Office Action for Application No. 200410068672.2, dated Apr. 28, 2010.

| INPUTS \ STATES | 1 - TRIPPED | 2 - WAITING FOR RESET | 3 - READY FOR RESET | 4 - WAITING FOR START | 5 - NORMAL OPERATION | 6 - RECOVERED |
|---|---|---|---|---|---|---|
| 1 - INITIAL | | | | | | |
| 2 - RESET PERMIT | | | | | | |
| 3 - RESET | | | | | | |
| 4 - START PERMIT | | | | | | |
| 5 - NORMAL | | | | | | |
| 6 - TRIP REQUESTED | | | | | | |
| 7 - START RECOVER | | | | | | |

FIG. 5

STATE MACHINE FUNCTION BLOCK WITH A USER MODIFIABLE STATE TRANSITION CONFIGURATION DATABASE

CROSS REFERENCES TO RELATED APPLICATIONS

The present application is related to U.S. patent application Ser. No. 10/656,005, entitled "STATE MACHINE FUNCTION BLOCK WITH A USER MODIFIABLE OUTPUT CONFIGURATION DATABASE," which is commonly-owned, and which is hereby incorporated by reference herein in its entirety for all purposes.

FIELD OF THE DISCLOSURE

The present disclosure generally relates to function blocks for use in process plants, and more particularly to configuring and implementing a state machine associated with a process plant.

BACKGROUND

Process control systems, like those used in chemical, petroleum or other processes, typically include one or more process controllers communicatively coupled to at least one host or operator workstation and to one or more field devices via analog, digital or combined analog/digital buses or lines. The field devices, which may be, for example valves, valve positioners, switches and transmitters (e.g., temperature, pressure and flow rate sensors), perform functions within the process plant such as opening or closing valves and measuring process parameters. The process controllers receive signals indicative of process measurements made by the field devices and/or other information pertaining to the field devices, use this information to implement control routines and then generate control signals which are sent over the buses or lines to the field devices to control the operation of the process. Information from the field devices and the controllers is typically made available to one or more applications executed by the operator workstation to enable an operator to perform any desired function with respect to the process, such as configuring the process, viewing the current state of the process, modifying the operation of the process, etc.

Additionally, in many processes, a separate safety system is provided to detect significant safety related problems within the process plant and to automatically close valves, remove power from devices, switch flows within the plant, etc., when a problem occurs which might result in or lead to a serious hazard in the plant, such as a spill of toxic chemicals, an explosion, etc. These safety systems typically have one or more separate controllers apart from the standard process control controllers, called logic solvers, which are connected to safety field devices via separate buses or communication lines installed within the process plant. The logic solvers use the safety field devices to detect process conditions associated with significant events, such as the position of certain safety switches or shutdown valves, overflows or underflows in the process, the operation of important power generation or control devices, the operation of fault detection devices, etc. to thereby detect "events" within the process plant. When an event (typically called a "cause") is detected, the safety controller takes some action (typically called an "effect") to limit the detrimental nature of the event, such as closing valves, turning devices off, removing power from sections of the plant, etc. Generally, these actions or effects include switching safety devices into a tripped or "safe" mode of operation which is designed to prevent a serious or hazardous condition within the process plant.

Systems within a process plant, such as process control systems and safety systems, typically may keep track statuses of various processes and/or the systems themselves. Input signals to a system may cause the status tracked by the system to change, and output signals generated by the system may depend on the current status of the system in addition to input signals to the system. Currently, the status of a system may be tracked using routines written in a programming language. Writing such routines can be tedious, time consuming and fraught with errors. In safety systems, such errors can be serious because a failure of the safety system to operate properly can lead to serious injury or even death on the part of plant personnel and to the destruction of potentially millions of dollars of equipment and material within a plant.

Also, the status of a system can be tracked using a programming technique for programmable controllers standardized by the International Electrotechnical Commission (IEC), commonly referred to as a "sequential function chart" (set forth in the IEC 61131-3 standard). But as is known to those of ordinary skill in the art, using a sequential function chart to keep track of the status of a system can be difficult. Additionally, similar to the routines written in a programming language, creating a sequential function chart can be tedious, time consuming and fraught with errors.

SUMMARY

A control system, a safety system, etc., within a process plant may each use one or more state machine function blocks that can be easily integrated into a function block diagram programming environment. Such a state machine function block may include one or more inputs, which may be used to cause a state machine implemented by the state machine function block to change states. The state machine function block may determine a next state to which it is to transition based on state transition configuration data indicative of the next state, if any. The state transition configuration data may be retrieved from a database based on the current state of the state machine and at least one of the inputs. The state machine function block may also include one or more outputs that are generated based on the state of the state machine. The inputs of the state machine function block may be associated with, for example, a process control system or a safety system, and the outputs may be used, for example, for control of field devices in the process control system or the safety system.

The state machine function block may be configured, at least in part, via a graphical user interface mechanism. The graphical user interface mechanism may include a plurality of graphical elements, wherein at least some of the graphical elements can be used to specify how the state machine should transition between states. In one example, a plurality of cells may be displayed on a display device of a computer, wherein each cell of the first plurality of cells corresponds to one of at least some possible pairings of ones of the at least one input and ones of the states of the plurality of states of the state machine. The plurality of the cells may be arranged in a matrix, for example, where columns of the matrix correspond to the plurality of possible states of the state machine, and rows of the matrix corresponds to inputs to the state machine (or vice versa). In a cell corresponding to a particular state and a particular input, a programmer may enter configuration data indicative of a next state using an input device of the computer. The next state configuration data is indicative of the next state to which the state machine should transition when the state machine is in the state corresponding to the cell and when the input corresponding to the cell is a particular value.

As another example, the graphical user interface may comprise a diagram where objects on the diagram represent states of the state machine. A programmer may, for example, place an arrow from one state to another state and also associate an input with the arrow. This may indicate that the state machine should transfer from the one state to the another state when the specified input is a particular value.

Embodiments of state machine function blocks as claimed herein may be easier to configure as compared to prior art techniques of keeping track of a status related to a control system or a safety system. For instance, some or all of the configuration may be accomplished using a graphical user interface mechanism such as the mechanism described above. Additionally, embodiments of state machine function blocks may be easy to integrate into a controller, a logic solver, field devices, etc., which use function block logic because the state machine function block can be integrated in the same or similar manner as other types of function blocks by interconnecting inputs and outputs of the state machine function block to other functions blocks, elements within a control strategy, an operator interface, etc. Further, the operation of the state machine function may be easily documented because its operation may be illustrated, at least in part, graphically such as in a matrix form. Different embodiments of state machine function blocks or mechanisms for configuring state machine function blocks may provide one or more, or none of the above-described advantages.

BRIEF DESCRIPTION OF THE DRAWINGS

The features and advantages of the methods, apparatus, and systems described herein will be best appreciated upon reference to the following detailed description and the accompanying drawings, in which:

FIG. 5 is an example matrix for entering next state configuration data for a state machine function block;

DETAILED DESCRIPTION

Process Plant Example

Figure 1:
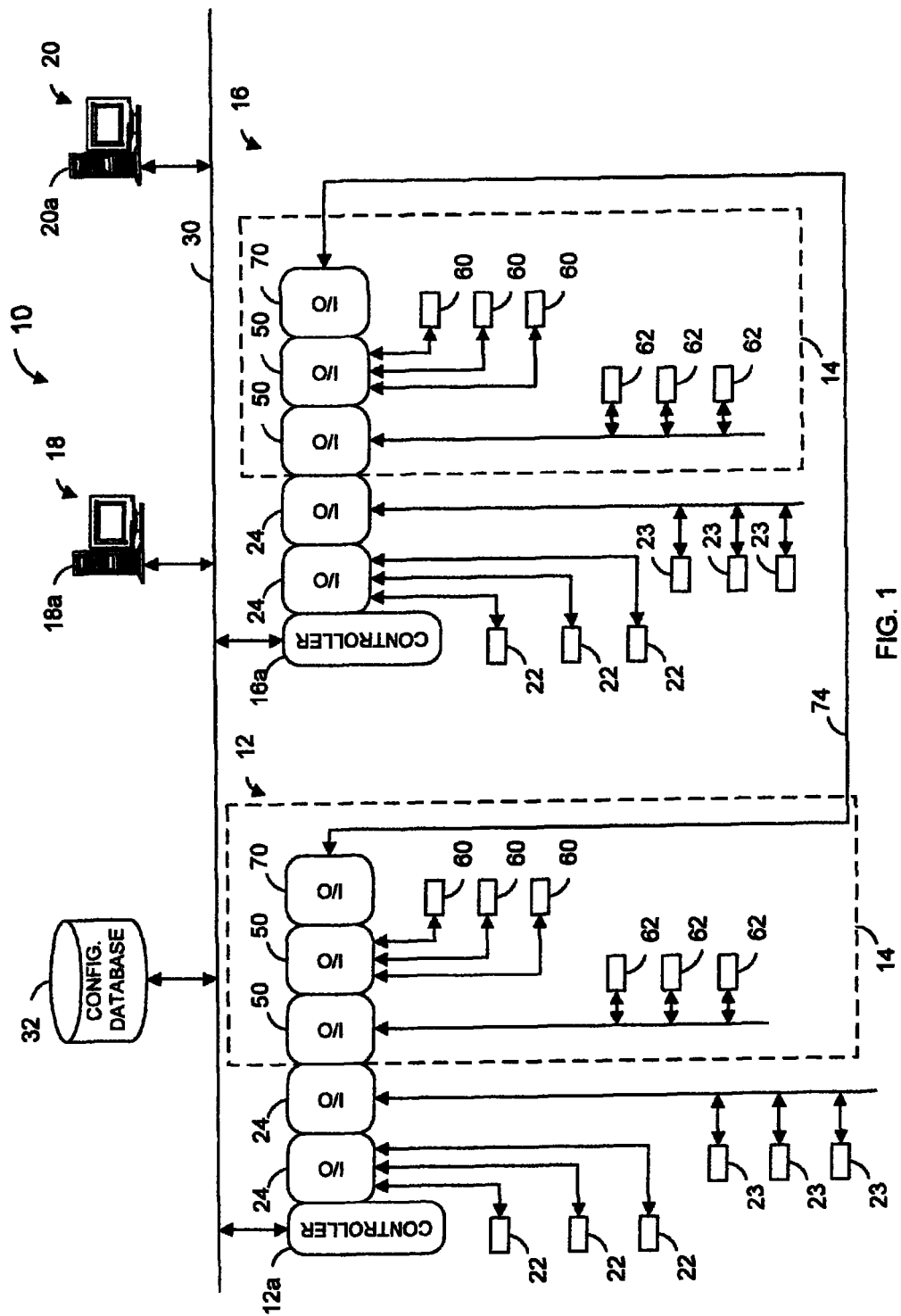
FIG. 1 is a block diagram of an example process plant.

FIG. 1 is a block diagram of an example process plant 10 that includes one or more nodes 12, 16, 18 and 20. In the example process plant 10 of FIG. 1, each of the nodes 12 and 16 includes a process controller 12a, 16a connected to one or more field devices 22 and 23 via input/output (I/O) devices 24 which may be, for example, Foundation Fieldbus interfaces, HART interfaces, etc. The controllers 12a and 16a are also coupled to one or more host or operator workstations 18a and 20a in the nodes 18 and 20 via a network 30 which may comprise, for example, one or more of a bus, a wired local area network (LAN) such as an Ethernet LAN, a wireless LAN, a wide area network (WAN), an intranet, etc. While the controller nodes 12, 16 and the I/O devices 24 and field devices 22, 23 associated therewith are typically located down within and distributed throughout the sometimes harsh plant environment, the operator workstation nodes 18 and 20 are usually located in control rooms or other less harsh environments easily assessable by controller personnel.

Generally speaking, the workstations 18a and 20a of the nodes 18 and 20 may be used to store and execute applications used to configure and monitor the process plant 10, and/or to manage devices 22, 23, 24 and controllers 12a, 16a in the process plant 10. Further, a database 32 may be connected to the network 30 and operate as a data historian and/or a configuration database that stores the current configuration of the process plant 10 as downloaded to and/or stored within the nodes 12, 16, 18, 20, 22, 23, 24, 50, and 70.

Each of the controllers 12a and 16a, which may be by way of example, the DeltaV™ controller sold by Emerson Process Management, may store and execute a controller application that implements a control strategy using a number of different, independently executed, control modules or blocks. The control modules may each be made up of what are commonly referred to as function blocks wherein each function block is a part or a subroutine of an overall control routine and operates in conjunction with other function blocks (via communications called links) to implement process control loops within the process plant 10. As is well known, function blocks typically perform one of an input function (such as that associated with a transmitter, a sensor or other process parameter measurement device), a control function (such as that associated with a control routine that performs PID, fuzzy logic, etc. control), or an output function which controls the operation of some device (such as a valve), to perform some physical function within the process plant 10. Of course hybrid and other types of function blocks exist and may be utilized. While a fieldbus protocol and the DeltaV™ system protocol may use control modules and function blocks designed and implemented in an object oriented programming protocol, the control modules could be designed using any desired control programming scheme including, for example, sequential function block, ladder logic, etc. and are not limited to being designed using function block or any other particular programming technique. As is typical, the configuration of the control modules as stored within the process control nodes 12 and 16 may be stored in the configuration database 32 which is accessible to applications executed by the workstations 18a and 20a. Function blocks may be stored in and executed by, for example, the controller 12a, 16a, which is typically the case when these function blocks are used for, or are associated with standard 4-20 ma devices and some types of smart field devices such as HART devices, or may be stored in and implemented by the field devices themselves, which can be the case with Fieldbus devices.

In the system illustrated in FIG. 1, the field devices 22 and 23 coupled to the controllers 12a and 16a may be standard 4-20 ma devices, or may be smart field devices, such as HART, Profibus, or Foundation Fieldbus field devices, which include a processor and a memory. Some of these devices, such as Foundation Fieldbus field devices (labeled with reference number 23 in FIG. 1), may store and execute modules, or sub-modules, such as function blocks, associated with the control strategy implemented in the controllers 12a and 16a. Of course, the field devices 22, 23 may be any types of devices, such as sensors, valves, transmitters, positioners, etc. and the I/O devices 24 may be any types of I/O devices conforming to any desired communication or controller protocol such as HART, Foundation Fieldbus, Profibus, etc.

The controllers 12a and 16a each include a processor that implements or oversees one or more process control routines, stored in a memory, which may include control loops, stored therein or otherwise associated therewith. The controllers 12a and 16a communicate with the field devices 22, 23, the workstations 18a, 20a and the database 32 to control a process in any desired manner. The controllers 12a and 16a each may be configured to implement a control strategy or control routine in any desired manner.

The process plant 10 may also include a safety system 14 (indicated by dotted lines) integrated with the process control nodes 12 and 16. The safety system 14 generally may operate as a Safety Instrumented System (SIS) to monitor and override the control provided by the process control nodes 12 and 16 to maximize the likely safe operation of the process plant 10.

Each of the nodes 12 and 16 may include one or more safety system logic solvers 50. Each of the logic solvers 50 is an I/O device having a processor and a memory, and is configured to execute safety logic modules stored in the memory. Each logic solver 50 is communicatively coupled to provide control signals to and/or receive signals from safety system field devices 60 and 62. Additionally, each of the nodes 12 and 16 includes at least one message propagation device (MPD) 70, which is communicatively coupled to other MPDs 70 via a ring or bus connection 74 (only part of which is illustrated in FIG. 1). The safety system logic solvers 50, the safety system field devices 60 and 62, the MPDs 70, and the bus 74 generally make up the safety system 14 of FIG. 1.

The logic solvers 50 of FIG. 1 may be any desired type of safety system control devices that include a processor and a memory that stores safety logic modules adapted to be executed on the processor to provide control functionality associated with the safety system 14 using the field devices 60 and 62. Of course, the safety field devices 60 and 62 may be any desired type of field devices conforming or using any known or desired communication protocol, such as those mentioned above. In particular, the field devices 60 and 62 may be safety-related field devices of the type that are conventionally controlled by a separate, dedicated safety-related control system. In the process plant 10 illustrated in FIG. 1, the safety field devices 60 are depicted as using a dedicated or point-to-point communication protocol, such as the HART or the 4-20 ma protocol, while the safety field devices 62 are illustrated as using a bus communication protocol, such as a Fieldbus protocol. The safety field devices 60 may perform any desired function, such as that of a shut-down valve, a shut-off switch, etc.

A common backplane (not shown) may be used in each of the nodes 12 and 16 to communicatively couple the controllers 12a and 16a to the process control I/O cards 24, to the safety logic solvers 50, and to the MPDs 70. The controllers 112a and 16a are also communicatively coupled to the network 30. The controllers 12a and 16a, the I/O devices 24, the logic solvers 50, the MPDs 70 may communicate with the nodes 18 and 20 via the network 30.

As will be understood by those of ordinary skill in the art, the backplane (not shown) in the node 12, 16 enables the logic solvers 50 to communicate locally with one another to coordinate safety functions implemented by these devices, to communicate data to one another, and/or to perform other integrated functions. Similarly, the backplane (not shown) in the node 16 enables the logic solvers 50 to communicate locally with one another to coordinate safety functions implemented by these devices, to communicate data to one another, and/or to perform other integrated functions. On the other hand, the MPDs 70 operate to enable portions of the safety system 14 that are disposed in vastly different locations of the plant 10 to still communicate with one another to provide coordinated safety operation at different nodes of the process plant 10. In particular, the MPDs 70 in conjunction with the bus 74 enable the logic solvers 50 associated with different nodes 12 and 16 of the process plant 10 to be communicatively cascaded together to allow for the cascading of safety-related functions within the process plant 10 according to an assigned priority. The MPDs 70 and the bus 74 provide the safety system with a communication link that is an alternative to the network 30.

Alternatively, two or more safety-related functions at different locations within the process plant 10 may be interlocked or interconnected without having to run a dedicated line to individual safety field devices within the separate areas or node of the plant 10. In other words, the use of the MPDs 70 and 72 and the bus 74 enables a safety engineer to design and configure a safety system 14 that is distributed in nature throughout the process plant 10 but that has different components thereof communicatively interconnected to enable the disparate safety related hardware to communicate with each other as required. This feature also provides scalability of the safety system 14 in that it enables additional safety logic solvers to be added to the safety system 14 as they are needed or as new process control nodes are added to the process plant 10.

Figure 2:
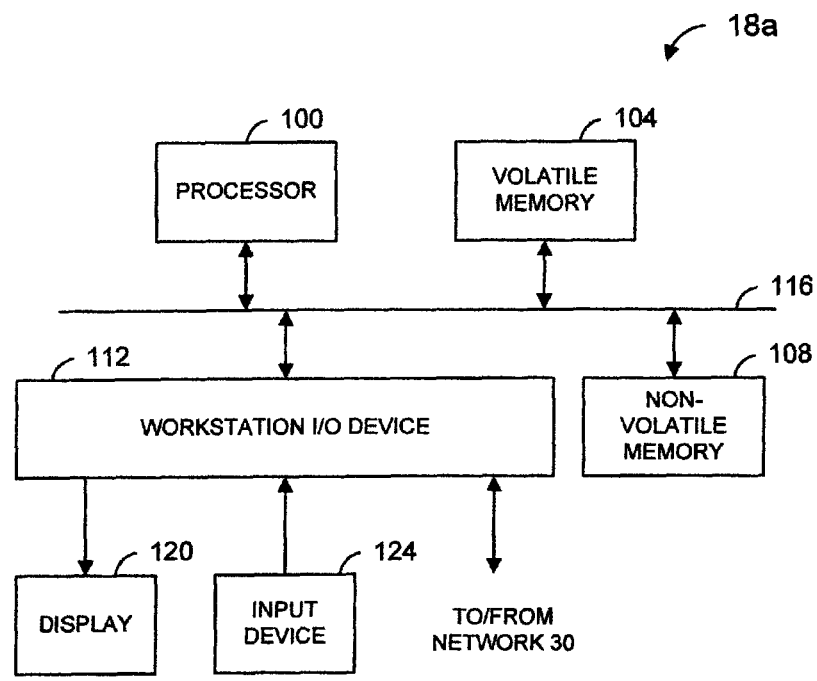
FIG. 2 is a block diagram of an example workstation schematically illustrated in FIG. 1.

FIG. 2 is a block diagram of an example workstation 18a (workstation 20a may comprise the same or similar device). The workstation 18a may include at least one processor 100, a volatile memory 104, and a non-volatile memory 108. The volatile memory 104 may include, for example, a random access memory (RAM). In some embodiments, the RAM may be backed up by one or more batteries so that data is not lost in the event of a power failure. The non-volatile memory 108 may include, for example, one or more of a hard disk, a read-only memory (ROM), a compact disk ROM (CD-ROM), a programmable ROM (PROM), an erasable programmable ROM (EPROM), an electrically erasable programmable ROM (EEPROM), a digital versatile disk (DVD), a flash memory, etc. The workstation 18a may also include a workstation I/O device 112. The processor 100, volatile memory 104, non-volatile memory 108, and workstation I/O device 112 may be interconnected via an address/data bus 116. The workstation 18a may also include at least one display device 120 and at least one user input device 124, which may be, for example, one or more of a keyboard, a keypad, a mouse, a track ball, a touch screen, a light pen, etc. In some embodiments, one or more of the volatile memory 104, non-volatile memory 108, and workstation I/O device 112 may be coupled to the processor 100 via a bus separate from the address/data bus 116 (not shown), or may be coupled directly to the processor 100.

The display device 120 and the user input device 124 are coupled with the workstation I/O device 112. Additionally, the workstation 18a is coupled to the network 30 via the workstation I/O device 112. Although the workstation I/O device 112 is illustrated in FIG. 2 as one device, it may comprise several devices. Additionally, in some embodiments, one or more of the display device 120 and the user input device 124 may be coupled directly to the address/data bus 116 or to the processor 100.

Referring now to FIGS. 1 and 2, a process control configuration application associated with one or more of the control nodes 12, 16 may be stored on and executed by one or more of workstations 18a and 20a. For example, the process control configuration application could be stored on the non-volatile memory 108 and/or the volatile memory 104, and executed by the processor 100. However, if desired, this application could be stored and executed in other computers associated with the process plant 10. Generally speaking, the process control configuration application permits a programmer to create and configure control routines, control modules, function blocks, programs, logic, etc., to be implemented by the controllers 12a, 16a, I/O devices 24, and/or the field devices 22, 23. These control routines, control modules, function blocks, programs, logic, etc., may then be downloaded to appropriate ones of the controllers 12a, 16a, I/O devices 24 and/or field devices 22, 23 via the network 30.

Similarly, a safety system configuration application associated with the safety system 14 may be stored on and executed by one or more of workstations 18a and 20a. For example, the safety system configuration application could be stored on the non-volatile memory 108 and/or the volatile memory 104, and executed by the processor 100. However, if desired, this application could be stored and executed in other computers associated with the process plant 10. Generally speaking, the safety system configuration application permits a programmer to create and configure control routines, control modules, function blocks, programs, logic, etc., to be implemented by the controllers 12a, 16a, the logic solvers 50, and/or the devices 60, 62. These control routines, control modules, function blocks, programs, logic, etc., may then be downloaded to appropriate ones of the controllers 12a, 16a, the logic solvers 50, and/or the devices 60, 62 via the network 30.

State Machine Function Block

Figure 3:
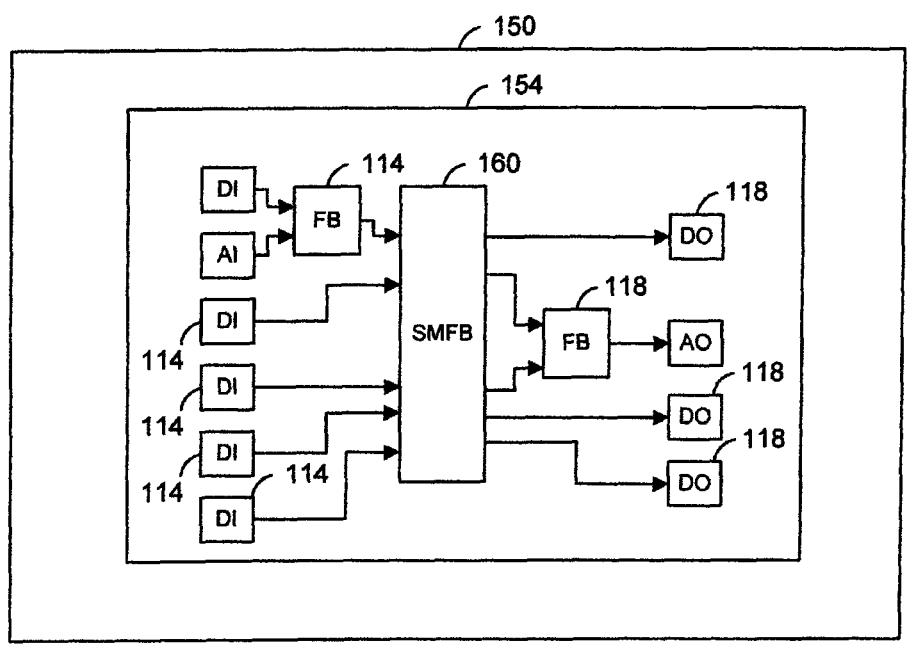
FIG. 3 is an example of a display that depicts a control module.

A control system or safety system configuration application may permit programming control modules and/or control routines using a function block programming paradigm. FIG. 3 illustrates one example of a display 150 depicting a control module 154. The display 150 may be part of a user interface associated with the configuration application, and the display 150 may be presented to a programmer, for example, via the display device 120 of the workstation 18a. The display 150 depicts the control module 154 having a set of communicatively interconnected function blocks that can be created and downloaded to appropriate ones of the controllers 12a, 16a, I/O devices 24, logic solvers 50, and/or devices 22, 23, 60, 62 via the network 30 for implementation during operation of a process plant. As illustrated in FIG. 3, the control module 154 includes a state machine function block (SMFB) 160, a plurality of analog input (AI) and digital input (DI) function blocks, a plurality of analog output (AO) and digital output (DO) function blocks, and other function blocks (FBs). The SMFB 160 has inputs communicatively interconnected with function blocks 114, which may be, for example, DI function blocks or other FBs. The SMFB 160 also has outputs connected to function blocks 118 which may be, for example, DO function blocks or other FBs. The control module 154 may control, or may be one of a plurality of control modules that together control, devices such as switches, valves, etc., as part of a control system, safety system, etc. Of course, control module 154 is just one example of a control module that employs SMFBs. In general, a control module may be programmed in any desired manner to include any types of function blocks communicatively coupled with any number of SMFBs in any desired manner, and configured in any desired or useful manner to perform any desired functionality. If used in, for example, a Fieldbus network, a control module may include any fieldbus type function blocks.

In some embodiments, one or more of the inputs to the SMFB 160 may be received from other than a function block. For example, one or more of the inputs to the SMFB 160 may be communicatively coupled to receive inputs from an operator via, for example, an operator interface. For example, an operator, using an operator interface implemented on a node such as node 18 or 20, could provide inputs to the SMFB 160.

The SMFB may be a function block that implements a state machine. In some embodiments, a state machine may include an entity (e.g., a device, software implemented by a processor, etc.) that can be in one of a plurality of states. The state machine may transition from one state to another state if a particular input to the state machine occurs. The SMFB may provide outputs that are based on the current state of the state machine. As just one example, the SMFB may provide one or more outputs that indicate the current state of the state machine. More generally, a state machine may include an entity (e.g., a device, software implemented by a processor, etc.) that stores a status of the entity, or some other entity (e.g., a process plant, a sub-part of a process plant, a component of a process plant, etc.), at a given time, and that may change the status and/or cause an action or output to take place based on inputs to the state machine.

Using the user interface associated with the configuration application, the programmer may design a control module such as the control module 154. As just one example, the user interface may provide a mechanism for a programmer to select desired function blocks from, for example, a stencil or palette that includes a plurality of standard or customized function block stencils. Additionally, the user interface may provide a graphical diagram onto which the programmer may insert or place depictions of function blocks. The programmer may use, for example, a mouse, a track ball, a keyboard, a key pad, a touch screen, etc., to select a function block from the stencil or palette, and then "drag and drop" the function block onto the graphical diagram. The programmer may additionally communicatively couple function blocks by, for example, drawing a line between an output of one function block and an input of another function block using, for example, a mouse, a track ball, a keyboard, a key pad, a touch screen, etc.

Once configured, the control module 154 may be implemented, for example, by one or more of the controllers 12a, 14a, 16a, I/O devices 24, logic solvers 50, and devices 22, 23, 60, 62.

Figure 4:
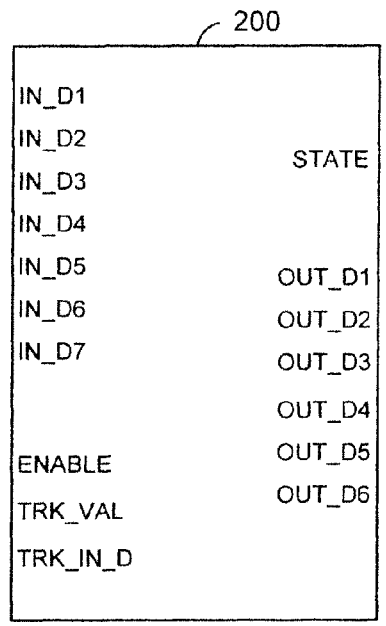
FIG. 4 is an example of a representation of a state machine function block.

FIG. 4 is one example of a representation of a SMFB 200 which may be displayed, for example, on a user interface display such as the display 150 of FIG. 3. The representation of the SMFB 200 indicates that the SMFB 200 includes seven data inputs (IN_D1 through IN_D7) and seven data outputs (STATE and OUT_D1 through OUT_D6). The data inputs generally may be indicative of conditions within the process plant, indicative of operator commands, etc., and that may cause a state machine implemented by a SMFB 200 to change states. The data outputs may include one or more indicators of the state of the state machine corresponding to the SMFB 200. For example, the STATE output may be an indicator of the state (e.g., state 1, state 2, state 3, etc.) of the state machine. The output OUT_D1 may be an indicator of whether the state machine is at a state "state 1." Similarly, the outputs OUT_D2, OUT_D3, OUT_D6 may be indicators of whether the state machine is at states "state 2", "state 3,",..., "state 6", respectively. The SMFB may also include other inputs besides data inputs, such as an ENABLE input, a TRK_VAL input, and a TRK_IN_D input, and may include other outputs besides outputs indicative of the state. The ENABLE, TRK_VAL, and TRK_IN_D inputs will be described in more detail below. Although the SMFB 200 is shown in FIG. 4 to have seven data inputs and seven data outputs, other embodiments may include any desired number of data inputs and data outputs. The number of data inputs and the number of data outputs of the SMFB 200 may or may not be configurable. In one embodiment, the number of outputs OUT_Dx generally corresponds to the number of possible states of the state machine implemented by the SMFB, and the number of possible states may be configurable. The number of outputs OUT_D1, OUT_D2, etc., however, need not correspond to the number of possible states of the state machine. For example, if there are fewer states than the number of outputs OUT_D1, OUT_D2, etc., the extra outputs can be left unused.

Using the user interface associated with the configuration program, the programmer may configure one or more function blocks such as the SMFB 200. With regard to configuring the SMFB, the programmer may specify a number of possible states, and how the inputs cause the state machine to transition between states. To allow a programmer to configure the SMFB, a configuration application may display on the display device 120 a user interface mechanism, such as a configuration window, screen, etc., associated with the function block.

FIG. 5 is one example of a user interface mechanism that may be used to configure, at least in part, a SMFB, such as the SMFB 200 of FIG. 4. The user interface mechanism comprises a table or matrix 300 (hereinafter referred to as the "matrix 300") that may be displayed as part of a configuration window, screen, etc., associated with the SMFB. The matrix 300 comprises a plurality of cells 304 arranged in rows and columns. Each column corresponds to one of a plurality of possible states of the state machine, and each row corresponds to an input to the state machine. Thus, each cell 304 corresponds to a state and an input. Although the example matrix 300 includes rows for seven inputs and six states, similar matrices having different numbers of states and outputs may be used for SMFBs having different numbers of inputs and states. The number of inputs and states may be configurable. In other examples, each row may correspond to one of a plurality of possible states of the state machine, and each column may correspond to an input to the state machine.

Referring to FIG. 4, the inputs "1" through "7" of matrix 300 correspond to the inputs IN_D1 through IN_D7 of the SMFB 200, respectively. Similarly, the states "1" through "6" of matrix 300 correspond to the outputs OUT_D1 through OUT_D6 of the SMFB 200, respectively. Additionally, in this example a programmer may be able to label each possible state and/or each of the inputs. For example, in FIG. 5 "state 1" is labeled "TRIPPED," and input 1 is labeled "INITIAL". Labeling inputs and/or states may help facilitate understanding the operation of the state machine.

Figure 6:
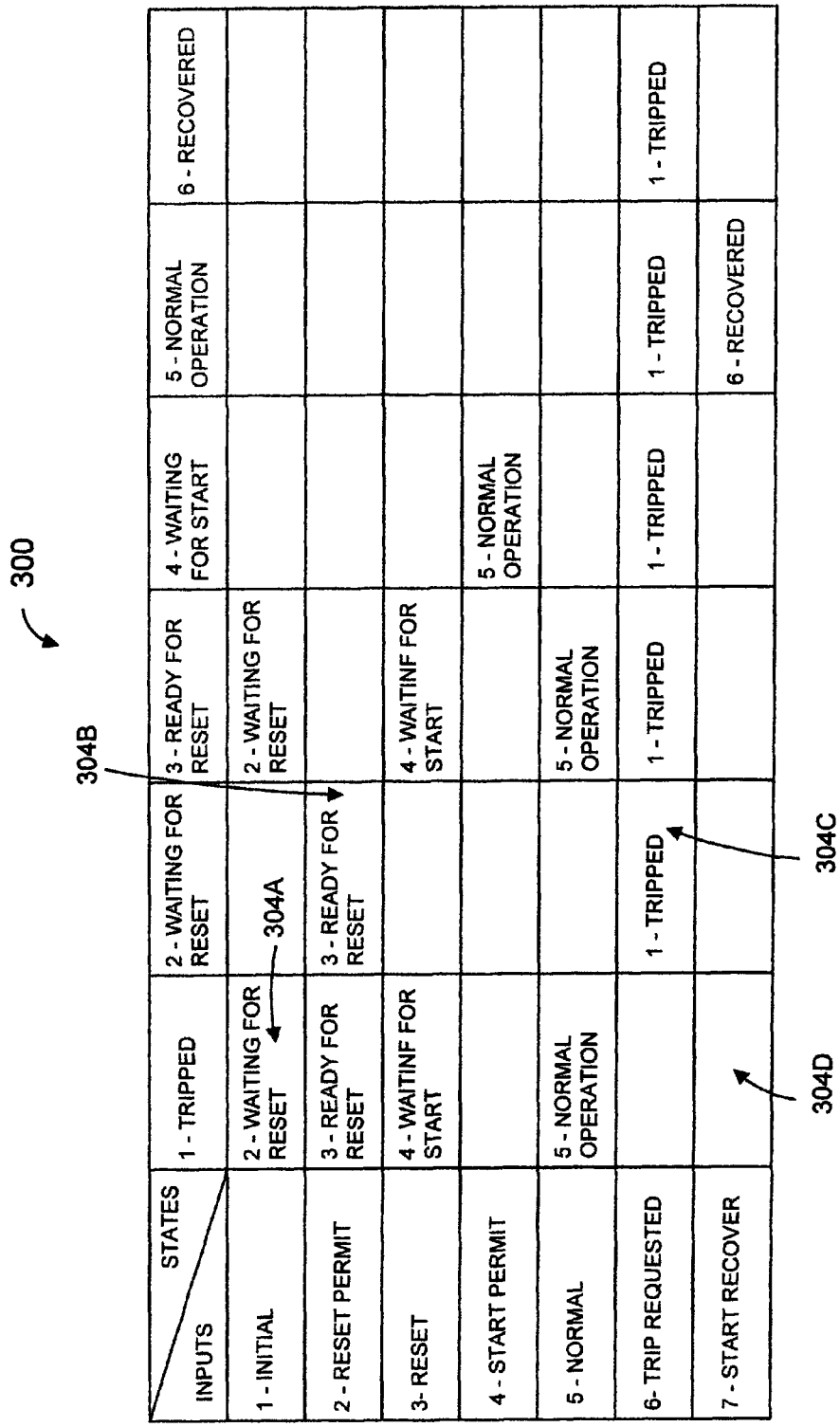
FIG. 6 is the example matrix of FIG. 5 in which next state configuration data is displayed in the matrix.

A programmer may configure the SMFB by entering configuration information into the cells 304. In particular, for a particular cell 304 that corresponds to one of the states and one of the inputs, the programmer can enter configuration data into the cell that indicates the state to which the SMFB should transition. FIG. 6 is an example of the matrix 300 having configuration data entered into some of the cells 304. For example, the cell 304A includes configuration data indicative of the next state to the state machine should transition when the state machine is in the "TRIPPED" state and when the "INITIAL" input is asserted. In particular, the configuration data of cell 304A indicates that the state machine should transition to the "WAITING FOR RESET" state. Similarly, cell 304B includes configuration data that indicates when the state machine is in the "WAITING FOR RESET" state and when the "RESET PERMIT" input is asserted, the state machine should transition to the "READY FOR RESET" state. Also, cell 304C includes configuration data that indicates when the state machine is in the "WAITING FOR RESET" state and when the "TRIP REQUESTED" input is asserted, the state machine should transition to the "TRIPPED" state.

In this particular example, if the programmer does not enter configuration data into a cell 304, it may be assumed that for that particular state and input, a state transition should not occur. For example, cell 304D does not include configuration data, indicating that when the state machine is in the "TRIPPED" state and when the "START RECOVER" input is asserted, the state machine should remain in the "TRIPPED" state. In other embodiments, the programmer may enter configuration data that indicates that the state machine should not change states for that particular state/input combination.

The programmer may enter configuration data into the matrix 300 using any of a variety of techniques, including techniques well known to those of ordinary skill in the art. For example, to enter configuration data into a cell 304, the programmer may select the cell 304 using a mouse, track ball, touch screen, etc. Then, the user could enter configuration data directly into the cell 304 via, for example, a keyboard. Alternatively, the programmer could select the cell 304 and then select an "edit," a "modify," etc., selection from a pull down menu, or select an "edit" button, a "modify" button, etc. Then, the user interface may display to the programmer a list of states via a pull down menu, window, display screen, etc. Optionally, the list of states may include the state to which the cell corresponds or a "NO TRANSITION" selection. Next, the programmer may select one of the states using, for example, a keyboard, a mouse, a trackball, a touch screen, etc. If the programmer selects the state to which the cell corresponds or the "NO TRANSITION" selection, the configuration data would indicate that for the state and input combination, no transition should occur.

Configuring the SMFB using a user interface that includes a matrix such as the matrix 300 may make implementing a state machine easier as compared to using, for example, a sequential function chart or a programming language such as C++. For instance, implementing a state machine using a C++ program likely would involve first creating a state transition diagram and then writing a program to implement the diagram. The, the program would have to be tested and debugged. With a SMFB configured using matrix such as the matrix 300, however, no writing of a program is required. Rather, "programming" would simply involve filling in the matrix. Additionally, because no software code need be written, debugging and testing of the code is not needed. Rather, testing may simply involve testing the various combinations of states and inputs to verify that the SMFB goes to the correct next states.

Further, the functioning of the SMFB can be easily understood by simply examining the matrix 300. Thus, the functioning of a configured SMFB could easily be documented by, for example, printing out a representation of the matrix.

A SMFB configured according to a matrix such as the matrix 300 can be used in a safety system or a process control system, for example. As just one example, SMFB configured according to a matrix such as the matrix 300 can be used, as part of a safety system, for managing a burner in a process plant. For instance, the SMFB could include states such as "IGNITE", "SHUT OFF GAS", and "VENT". When starting up the burner, the SMFB could first go to the VENT state to cause any gas in the burner to be vented. Then, the SMFB could go to the IGNITE state to ignite the burner. Also, if the flame of the burner goes out, the SMFB could go to the SHUT OFF GAS state to shut off gas to the burner. Then, the SMFB could go to the VENT state.

A SMFB configured according to a matrix such as the matrix 300 can be implemented by one or more of the controllers 12a, 16a, I/O devices 24, logic solvers 50, and devices 22, 23, 60, 62. In some embodiments, the SMFB, may be implemented by a processor configured according to software, by a programmable logic device, e.g., a device including one or more of a gate array, a standard cell, a field programmable gate array (FPGA), a PROM, an EPROM, an EEPROM, a programmable array logic (PAL), a programmable logic array (PLA), etc.

The configuration data associated with a SMFB (for example, data entered into a matrix such as the matrix 300 and, optionally, other configuration data) may be stored on a computer readable medium such as a hard disk, a RAM, a ROM, a CD-ROM, an EPROM, an EEPROM, a DVD, a FLASH memory, etc., and/or a memory associated with a processor.

Figure 7:
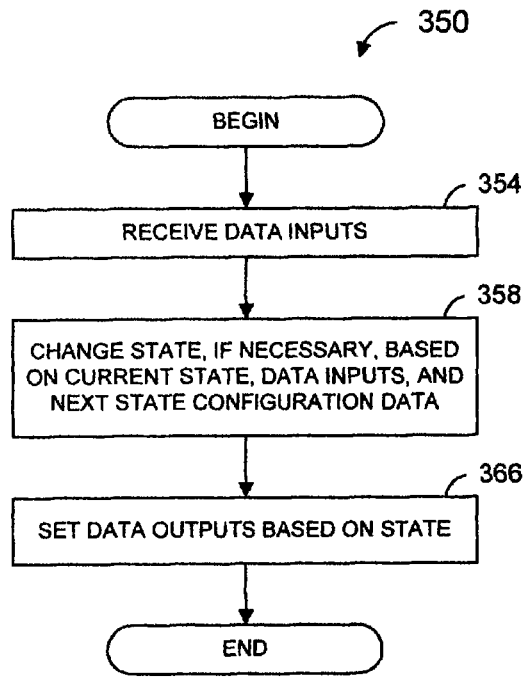
FIG. 7 is a flow diagram of an example method of operation of a state machine function block.

FIG. 7 is a flow diagram of an example method of operation of a configured SMFB. The method 350 may be implemented periodically and/or in response to a triggering event, for example. At a block 354, the SMFB receives its data inputs. Referring to FIG. 4 for example, the SMFB receives inputs IN_D1 through IN_D7. At a block 358, the SMFB changes a state of its state machine, if necessary, based on the data inputs, the current state of the SMFB, and configuration data stored in a configuration database. The data of the configuration database may include data entered via a matrix such as the matrix 300. The state may be changed based on other factors as well. For example, as will be described in more detail below, the SMFB may be configured to ignore one or more of the data inputs. Thus, changing the state may also be based on configuration data that indicates which, if any, of the data inputs are to be ignored. As another example, two or more data inputs may indicate a state change should occur from a current state to two or more next states. Thus, the SMFB may select one of the data inputs to determine to which of the possible next states the SMFB should transition based on priority data that prioritizes the data inputs. As yet another example, in some embodiments inputs to the SMFB may include a status (e.g., GOOD status or BAD status). Thus, changing the state may also be based on, for example, configuration data that indicates how an input having a BAD status should be handled.

Then, at a block 366, the SMFB may set its data outputs based on the current state of the state machine. For example, if the data outputs are to be indicative of the current state, then the data outputs may be set accordingly.

Referring again to FIG. 4, the SMFB may optionally include an "ENABLE" input. In one embodiment, if the ENABLE input is deasserted, the SMFB may be forced into a disabled state (e.g., state 0) and should remain in that state until the ENABLE input is asserted. When the ENABLE input is then asserted, the SMFB may be forced into an initial state (e.g., state 1), after which the SMFB may transition to other states according to the configuration data entered into a configuration matrix such as the matrix 300 of FIG. 5.

The SMFB may additionally include an input or inputs to force the state machine into a desired state. For example, the SMFB 200 includes a TRK_IN_D input and a TRK_VAL input. When the TRK_IN_D input is asserted, the SMFB may be forced into a state specified by the TRK_VAL input. For example, if the TRK_VAL input is "6" and the TRK_IN_D input is asserted, the SMFB may be forced into the state "6."

The SMFB may optionally be configured in additional ways. For example, the SMFB may include an input (or transition) mask that indicates whether one or more, if any, of the inputs IN_D1, IN_D2, etc., should be ignored. Also, the SMFB may be configured to respond to inputs that may have a plurality of statuses. For instance, one or all of the inputs to the SMFB may have a "good" status or a "bad" status, and the SMFB may be configured to respond differently depending on the status of an input. In one particular example, the SMFB may be configured to ignore an input that is "bad," use the input even if it is "bad," or use the last "good" value of the input. Further, the SMFB may include a RESET parameter that, when true, forces the SMFB into the "1" state.

The various configuration data described above and the next state configuration data can be stored on the same computer readable medium or on different computer readable media.

Figure 8:
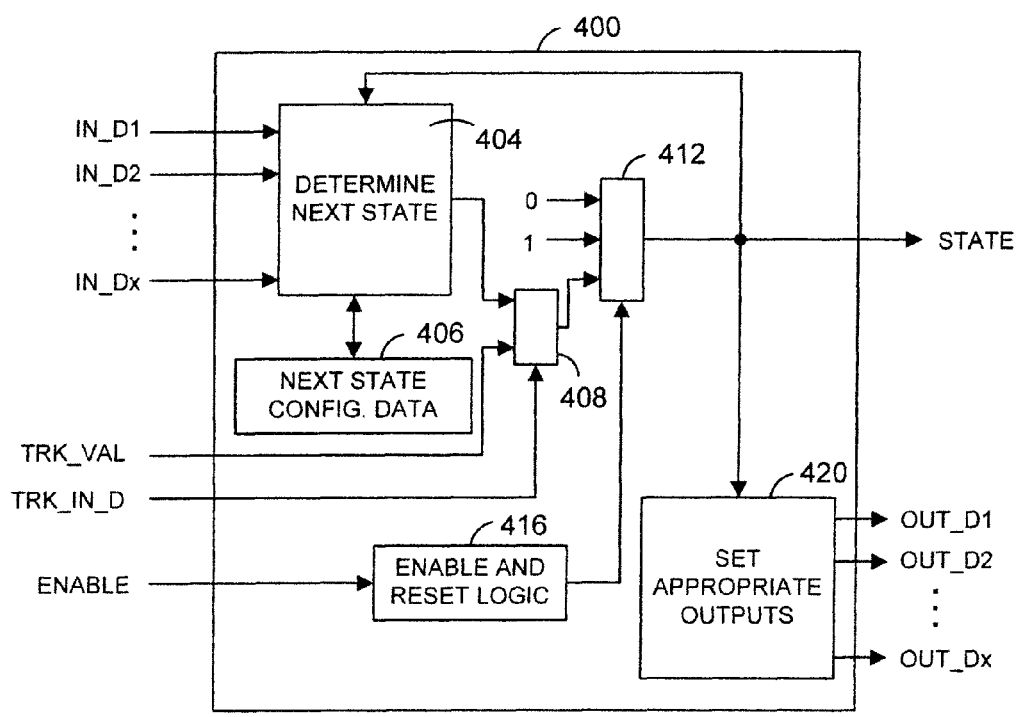
FIG. 8 is a block diagram of an example state machine function block.

FIG. 8 is a block diagram of one example of a SMFB. The SMFB 400 includes logic 404 that determines a next state based, at least in part, on the inputs IN_D1, IN_D2, etc., and the current state of the SMFB 400. In particular, the logic 404 accesses next state configuration data stored in a next state configuration database 406. The database 406 may be stored on a computer readable medium such as described above. The next state configuration data may comprise configuration data entered into a matrix such as the matrix 300 of FIG. 5.

The output of the logic 404 is provided to switching logic 408. The switching logic 408 selects between the output of the logic 404 and the input TRK_VAL based on the TRK_IN_D input. For example, if the TRK_IN_D input is asserted, the switching logic 408 may select the TRK_VAL input. Otherwise, the switching logic 408 may select the output of the logic 404.

The output of the switching logic 408 is provided to switching logic 412, which selects between the output of the switching logic 408, the value 0 and the value 1 based on the output of enable and reset logic 416. The output of the enable and reset logic 416 is indicative of whether the state should be forced into a disabled state (state 0) or an initial state (state 1). The enable and reset logic 416 generates this output based on the ENABLE input. For example, if the ENABLE input is deasserted, the output of the enable and reset logic 416 may indicate that the state should be forced to 0. If the ENABLE input changes from deasserted to asserted, the output of the enable and reset logic 416 may indicate that the state should be forced to 1. If the ENABLE is asserted and was previously asserted, the output of the enable and reset logic 416 may indicate that the state should not be forced to 0 or 1.

The output of the switching logic 412 is the current state of the SMFB 400, and may be provided as an output of the SMFB 400. The output of the switching logic 412 may also be provided to logic 420 that sets an appropriate output OUT_D1, OUT_D2, etc., that corresponds to the current state of the SMFB.

Each of the blocks 404, 408, 412, 416, and 420 may be implemented by one or more of hardware, software, and firmware. Additionally, some of the blocks may be combined, reordered, modified, or omitted, and additional blocks may be added. As merely one example blocks 408 and 412 could be combined into a single block.

Figure 9:
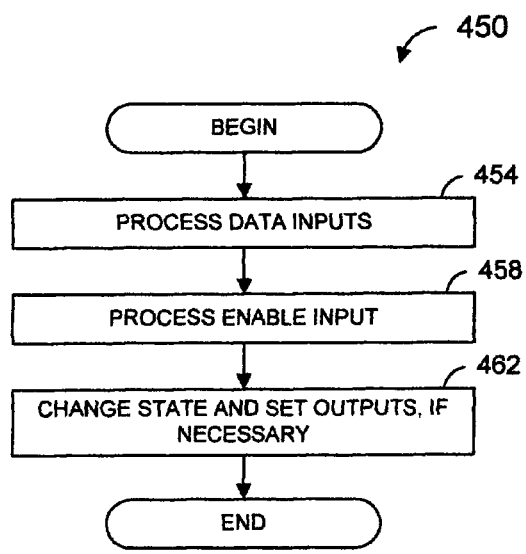
FIG. 9 is a flow diagram of another example method of operation of a state machine function block.

FIG. 9 is a flow diagram of a method of operation of the example SMFB 400. The method 450 of FIG. 9 may be implemented, for example, periodically and/or upon a triggering event. At a block 454, the data inputs of the SMFB 400 are processed. For example, it may be determined if any of the data inputs IN_D1, IN_D2, etc., has been asserted. As another example, if one or more of the data inputs has a "BAD" status, it may be determined how to handle the "BAD" input(s). At a block 458, the ENABLE input of the SMFB 400 is processed. For example, it may be determined whether the ENABLE input is asserted and/or whether it has changed since it was previously processed.

At a block 462, a state of the SMFB 400 may be changed, if necessary. Additionally, one or more data outputs of the SMFB 400 may be changed, if necessary. For example, it may be determined that a change in the data inputs indicates that the state of the SMFB 400 should be changed. Additionally, if the state changes, it may be that one or more data outputs of the SMFB 400 should be changed.

Figure 10:
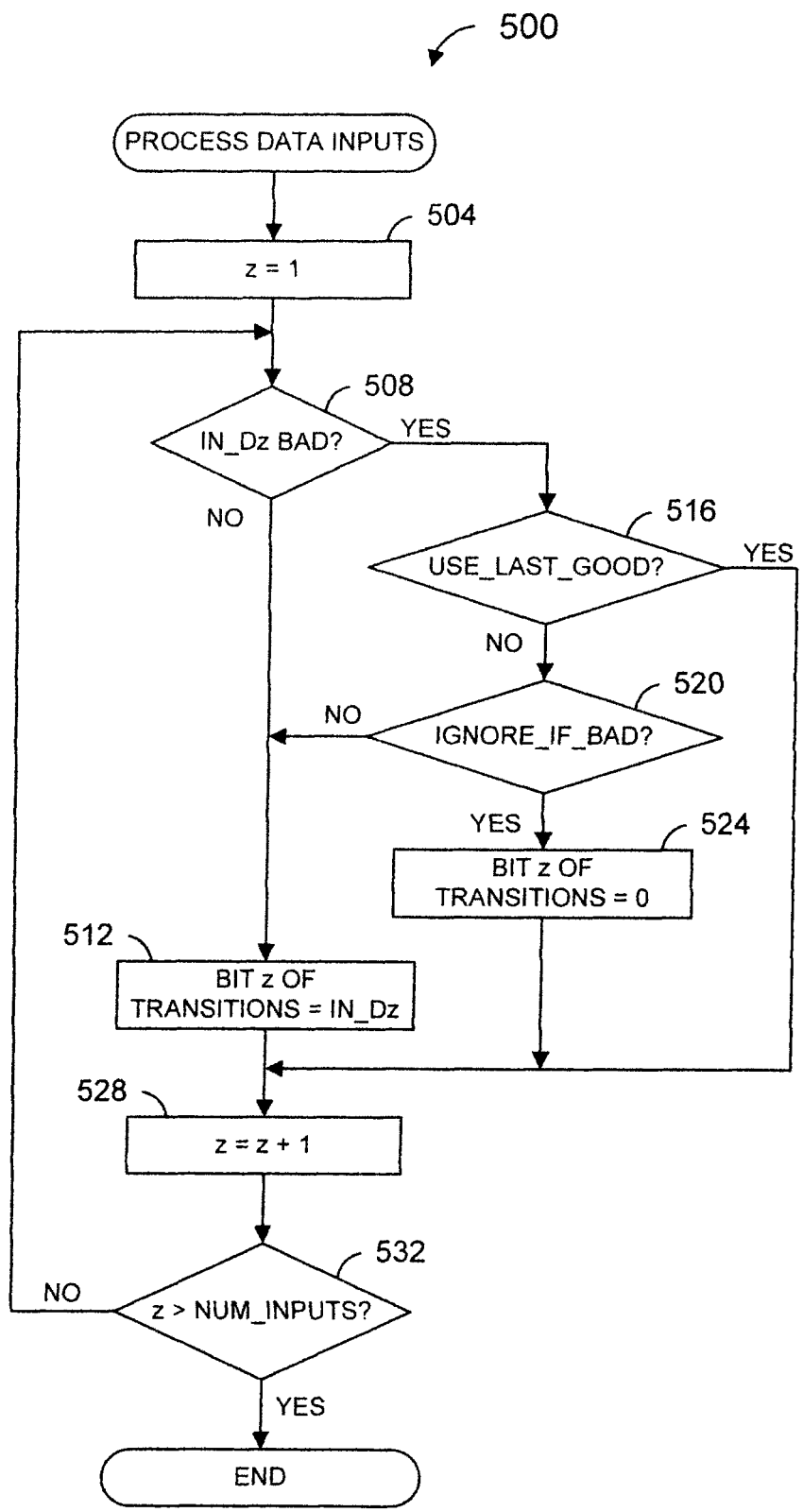
FIG. 10 is a flow diagram of an example routine for processing data inputs to a state machine function block.

Several example routines that may be used to implement the method 450, at least in part, will now be described. For instance, FIG. 10 is a flow diagram of an example routine 500 that may be used to process the data inputs IN_D1, IN_D2. etc., to the SMFB. At a block 504, a variable z is set to one. At a block 508, it is determined whether the status of the data input IN_Dz is "BAD"? If the status is not bad, then bit number z of a variable TRANSITIONS is set to the value of the data input IN_Dz. If the status is bad, then it may be determined how the data input is to be handled. In one example, the SMFB may handle "BAD" inputs in one of three ways: the BAD input may be used anyway (ALWAYS_USE), it may be ignored (IGNORE_IF_BAD), or the last "GOOD" input value may be used (USE_LAST_GOOD). Thus, at a block 516, it may be determined if the SMFB is to use the last "GOOD" data input. If the SMFB is to use the last "GOOD" value, then the block 512 may be skipped. Otherwise, it may then be determined at block 520 if the SMFB is to ignore the BAD input value. If the SMFB is not to ignore the BAD value, then the routine may proceed to the block 512. If the SMFB is to ignore the BAD value, then the routine may proceed to a block 524. At the block 524, bit number "x" of the variable TRANSITIONS is set to 0.

At a block 528, the variable z is incremented, and at a block 532, it may be determined if the variable z is greater than the number of data inputs to the SMFB. If z is not greater than the number of data inputs to the SMFB, the routine may proceed back to the block 508 to process the next data input. Otherwise, the routine may end.

Figure 11:
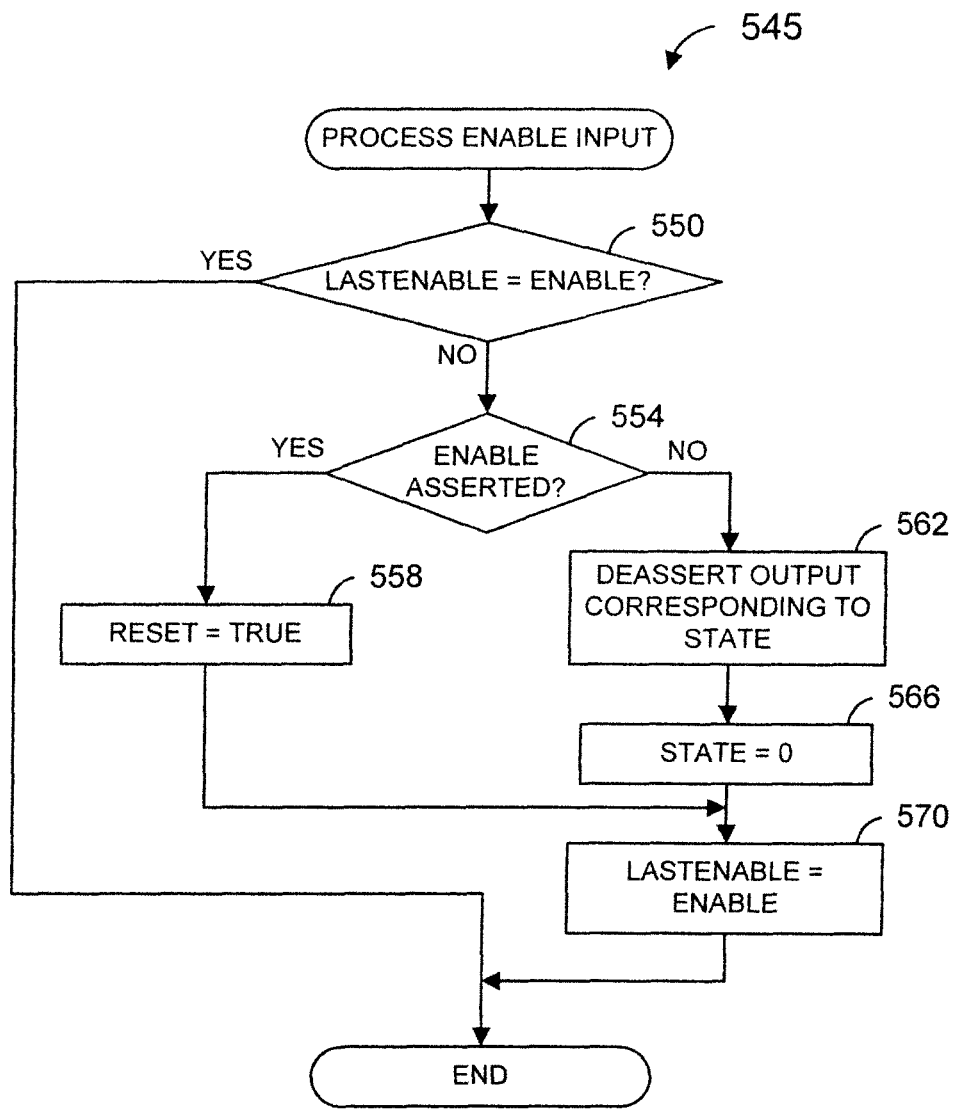
FIG. 11 is a flow diagram of an example routine for processing an enable input to a state machine function block.

FIG. 11 is a flow diagram of an example routine 545 that may be used to process the ENABLE input to the SMFB. At a block 550, it may be determined whether a value of a variable LASTENABLE is the same as the value of the ENABLE input. The LASTENABLE variable is generally indicative of the value of the ENABLE at a previous time (for example, the value of the ENABLE variable during the previous running of the routine 545). If the values of LASTENABLE and ENABLE are the same, the routine 545 may end. Otherwise, the routine may proceed to a block 554 at which it may be determined if the ENABLE input is asserted. If the ENABLE input is asserted, then at a block 558 a variable RESET may be set to TRUE.

If at the block 554 it is determined that the ENABLE input is not asserted, then at block 562, the output OUT_D1, OUT_D2, etc., corresponding to the current value of a STATE variable is deasserted. Then, at a block 566, the STATE variable is set to 0. After the blocks 558 and 566, the routine may proceed to a block 570, at which the variable LASTENABLE is set to the value of the ENABLE input. After the block 570, the routine may end.

Figure 12:
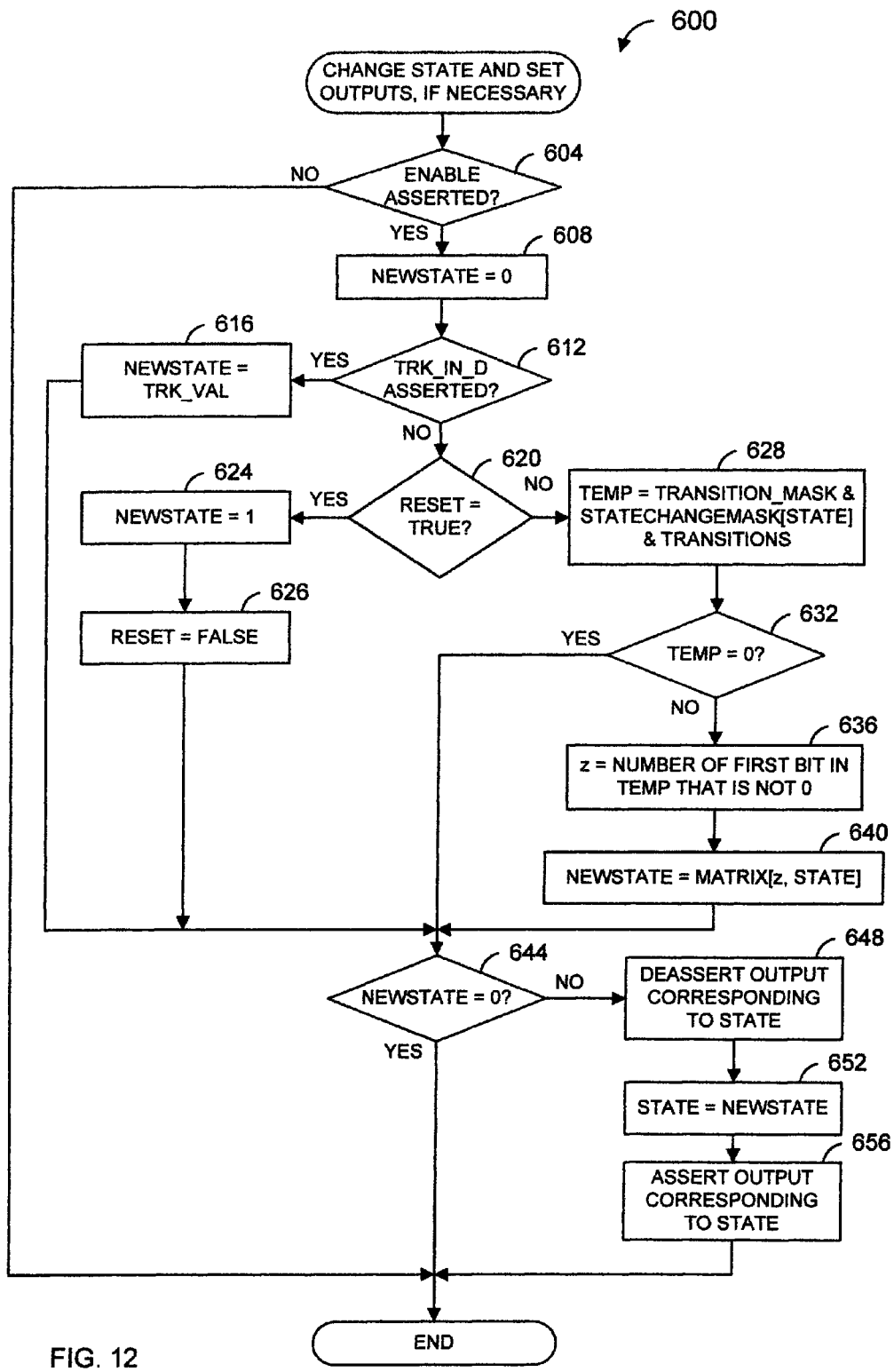
FIG. 12 is a flow diagram of an example routine for changing a state and setting outputs of a state machine function block.

FIG. 12 is a flow diagram of an example routine 600 that may be used to determine a next state of the SMFB and to set an appropriate output OUT_D1, OUT_D2, etc., if necessary. At a block 604, it may be determined if the ENABLE input is asserted. If it is not, the routine may end. If the ENABLE input is asserted, the routine may proceed to a block 608 at which a variable NEWSTATE is set to 0. Next, at a block 612, it may be determined if the input TRK_IN_D is asserted. If it is asserted, the routine may proceed to a block 616 at which the NEWSTATE variable is set to the value of the input TRK_VAL.

If is determined at the block 612 that the TRK_IN_D input is not asserted, the routine may proceed to a block 620. At the block 620, it may be determined if the variable RESET is TRUE. If it is, the routine may proceed to a block 624 at which the NEWSTATE variable may be set to 1. Then, at a block 626, the RESET variable may be set to FALSE.

If it determined at the block 620 that the variable RESET is not TRUE, then the routine may proceed to a block 632. At the block 632, a variable TEMP may be determined by bitwise ANDing a TRANSITION_MASK variable, the TRANSITIONS variable, and an element of an array STATECHANGEMASK pointed to by the variable STATE. The TRANSITION_MASK variable may be a configurable variable that can be used to prevent certain inputs IN_Dx from causing a state change to occur. For example, if a programmer wished to prevent the input IN_D3 from causing the state machine to change state, the programmer could set the third bit of the variable TRANSITION_MASK to 0. If the programmer wished to allow the input D3 to cause the state machine to change state, the programmer could set the third bit of the variable TRANSITION_MASK to 1.

Each element of the STATECHANGEMASK array may be a variable that indicates, for a corresponding one of the states, which inputs IN_D1, IN_D2, etc., will cause a state change. In particular, each element of the array may correspond to one of the states of the state machine. For example, STATECHANGEMASK[1] may correspond to state 1, STATECHANGEMASK[2] may correspond to state 2, etc. Additionally, each bit of each element may correspond to one of the inputs IN_D1, IN_D2, etc. For instance, bit 1 may correspond to IN_D1, bit 2 may correspond to IN_D2, etc. Referring to FIG. 6 for example, for the matrix 300 the STATECHANGEMASK array would have 6 elements, and the element STATECHANGEMASK[3] would be 0x44.

After the block 628, the routine may proceed to a block 632 at which it may be determined if the variable TEMP is 0. If it is not 0, the routine may proceed to a block 636 at which a variable z may be set to the number of the first bit (i.e., starting from the least significant bit) in the variable TEMP that is not zero. In effect, this sets priorities of the inputs based on their order such that IN_D1 is the highest priority, IN_D2 is the next highest priority, IN_D3 is the next highest priority, etc. In other embodiments, other prioritization schemes could be used. For example, a programmer could be allowed to assign priorities to the inputs, or a different priority order could be used (e.g., IN_D1 is the lowest priority, IN_D2 is the next lowest priority, etc.). The priorities could be set for the SMFB as a whole or for each state.

Then, at a block 640, the variable NEWSTATE may be set to the value of the state transition matrix at row z and column STATE.

After blocks 616, 626, and 640, the routine may proceed to a block 644. If at the block 632, it is determined that the variable TEMP is 0, the routine may also proceed to the block 644. At the block 644, it may be determined if the variable NEWSTATE is 0. If it is 0, the routine may end. If it is not 0, the routine may proceed to a block 648 at which the output OUT_D1, OUT_D2, etc., corresponding to the STATE variable is deasserted. Then, at a block 652, the variable STATE is set to the value of the variable NEWSTATE. At a block 656, the output. OUT_D1, OUT_D2, etc., co responding to the STATE variable is asserted, and the routine may end.

It is to be understood that the method 450 of FIG. 9 and the routines of FIGS. 10-12 are merely examples, and that in other examples, blocks may be modified, new blocks may be added, blocks may be reordered, blocks may be omitted, and/or blocks may be combined. Referring to FIG. 10, as just one example, the blocks 508, 516, 520, and 524 may be omitted if special handling of inputs having a "BAD" status is not needed or desired.

As another example, the block 636 could be modified so that the variable z is set to the number of the last bit in TEMP that is not 0. As yet another example, the block 636 could be modified to set z to the number corresponding to one of the bits in TEMP that is not 0 based on some priority data.

Referring again to FIG. 4, all of the data outputs need not be indicators of the state of the state machine corresponding to the SMFB 200. For example, in one embodiment the values for the outputs OUT_D1, OUT_D2, etc., corresponding to various states of the state machine may be configurable. Thus, for example, for certain states a plurality of the outputs OUT_D1, OUT_D2, etc., may be asserted. To allow a programmer to configure the SMFB, a configuration application may display on the display device 120 a user interface mechanism, such as a configuration window, screen, etc., associated with the function block.

Figure 13:
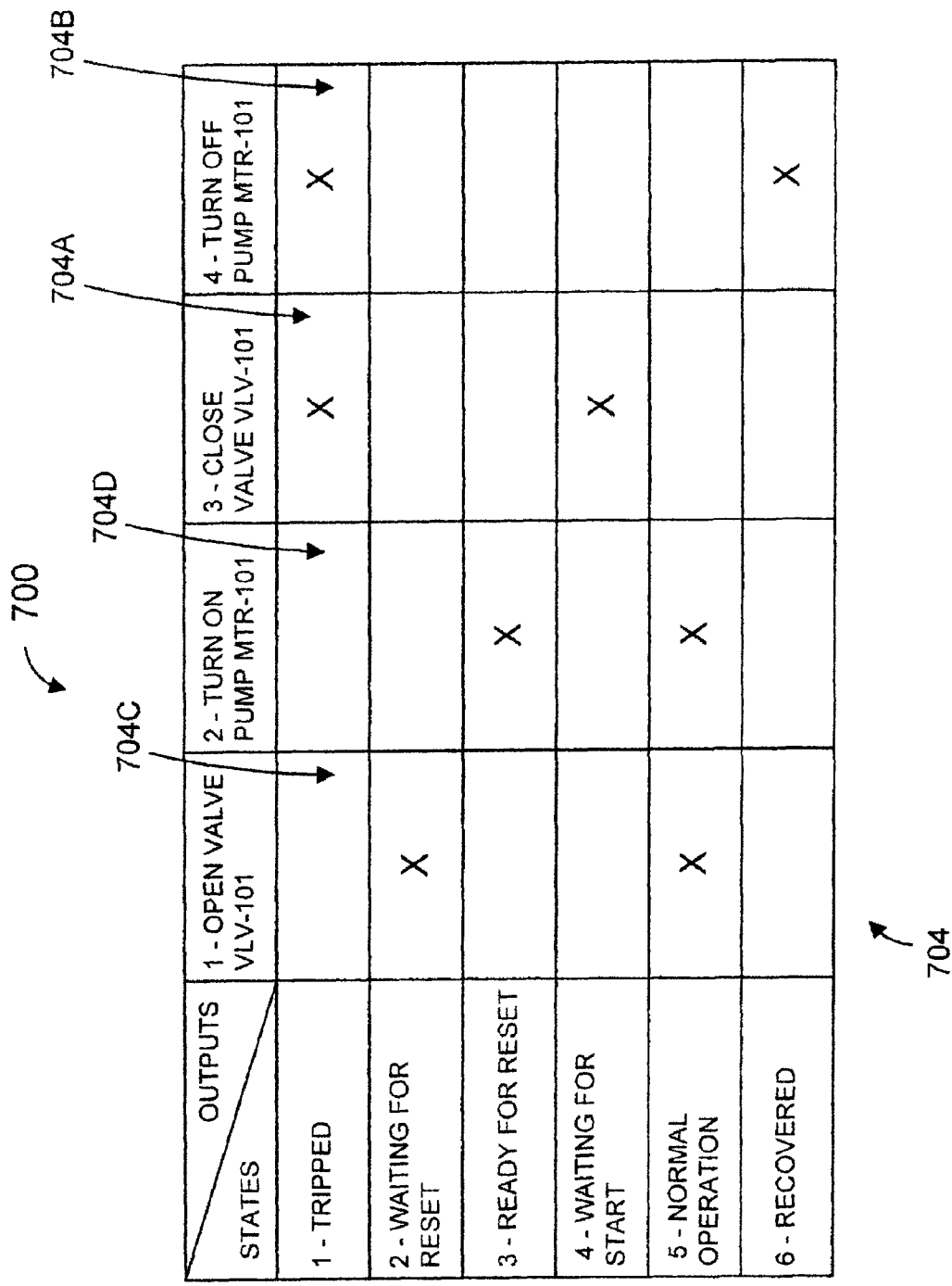
FIG. 13 is an example matrix for entering output configuration data for a state machine function block.

FIG. 13 is one example of a user interface mechanism that may be used to configure, at least in part, a SMFB, such as the SMFB 200 of FIG. 4. The user interface mechanism comprises a table or matrix 700 (hereinafter referred to as the "matrix 700") that may be displayed as part of a configuration window, screen, etc., associated with the SMFB. The matrix 700 comprises a plurality of cells 704 arranged in rows and columns. Each column corresponds to one of a plurality of outputs OUT_D1, OUT_D2, etc., of the state machine function block, and each row corresponds to one of the possible states of the state machine. Thus, each cell 704 corresponds to a state and an output. In other examples, each column may correspond to one of the plurality of outputs, and each column may correspond to one of the possible states of the state machine.

The outputs "1" through "4" of matrix 700 may correspond to the outputs OUT_D1 through OUT_D4 of the SMFB, respectively. Similarly, the states "1" through "6" of matrix 700 may correspond to the possible states of the state machine. Additionally, in this example a user may be able to label each of the outputs. For example, in FIG. 13 "output 1" is labeled "OPEN VALVE VLV-101". Labeling outputs may help facilitate understanding the operation of the state machine and/or interfacing the state machine with the process plant.

A programmer may configure the SMFB by entering configuration information into the cells 704. In particular, for a particular cell 704 that corresponds to one of the states and one of the outputs, the programmer can enter configuration data into the cell that indicates that, when the state machine is in that state the output should be asserted. In the example matrix 700, configuration data has been entered into some of the cells 704. For example, the cell 704A includes configuration data that indicates that when the state machine is in the "TRIPPED" state the output OUT_D3 should be asserted. Similarly, the cell 704B includes configuration data that indicates that when the state machine is in the "TRIPPED" state the output OUT_D4 should be asserted.

In this particular example, if the programmer does not enter configuration data into a cell 704, it may be assumed that for that particular state, the corresponding output should not be asserted. For example, cells 704C and 704D do not include X's, indicating that when the state machine is in the "TRIPPED" state the outputs OUT_D1 and OUT_D2 should not be asserted. In other embodiments, the programmer may enter configuration data that indicates that the state machine should not assert particular outputs if in a particular state. Similarly, it may be possible to indicate that for a particular state and output, it doesn't matter whether the output is asserted or not asserted.

The programmer may enter configuration data into the matrix 700 using any of a variety of techniques, including techniques well known to those of ordinary skill in the art. For example, to enter configuration data into a cell 704, the programmer may select the cell 704 using a mouse, track ball, touch screen, etc. Then, the user could enter configuration data directly into the cell 704 via, for example, a keyboard. Alternatively, the programmer could select the cell 704 and then select an "edit," a "modify," etc., selection from a pull down menu, or select an "edit" button, a "modify" button, etc. Then, the user interface may display to the programmer a list of selections via a pull down menu, window, display screen, etc. For example, the list of selections may include an "assert output" selection, a "deassert output" selection, and, optionally, a "don't care" selection. Next, the programmer may select one of the selections using, for example, a keyboard, a mouse, a trackball, a touch screen, etc. If the programmer selects the "assert output" selection, the configuration data may indicate that for the corresponding state, the corresponding output should be asserted. For example, an "X" may be displayed in the cell, a "1" may be displayed in the cell, the word "TRUE" may be displayed in the cell, the word "ASSERT" may be displayed in the cell, etc. If the programmer selects the "deassert output" selection, the configuration data may indicate that for the corresponding state, the corresponding output should not be asserted. For example, the cell may be left blank, a "0" may be displayed in the cell, the word "FALSE" may be displayed in the cell, the word "DEASSERT" may be displayed in the cell, etc.

Although the example matrix 700 includes rows for six states and four outputs, similar matrices having different numbers of states and outputs may be used for SMFBs having different numbers of states and outputs. The number of states and outputs may be configurable.

Figure 14:
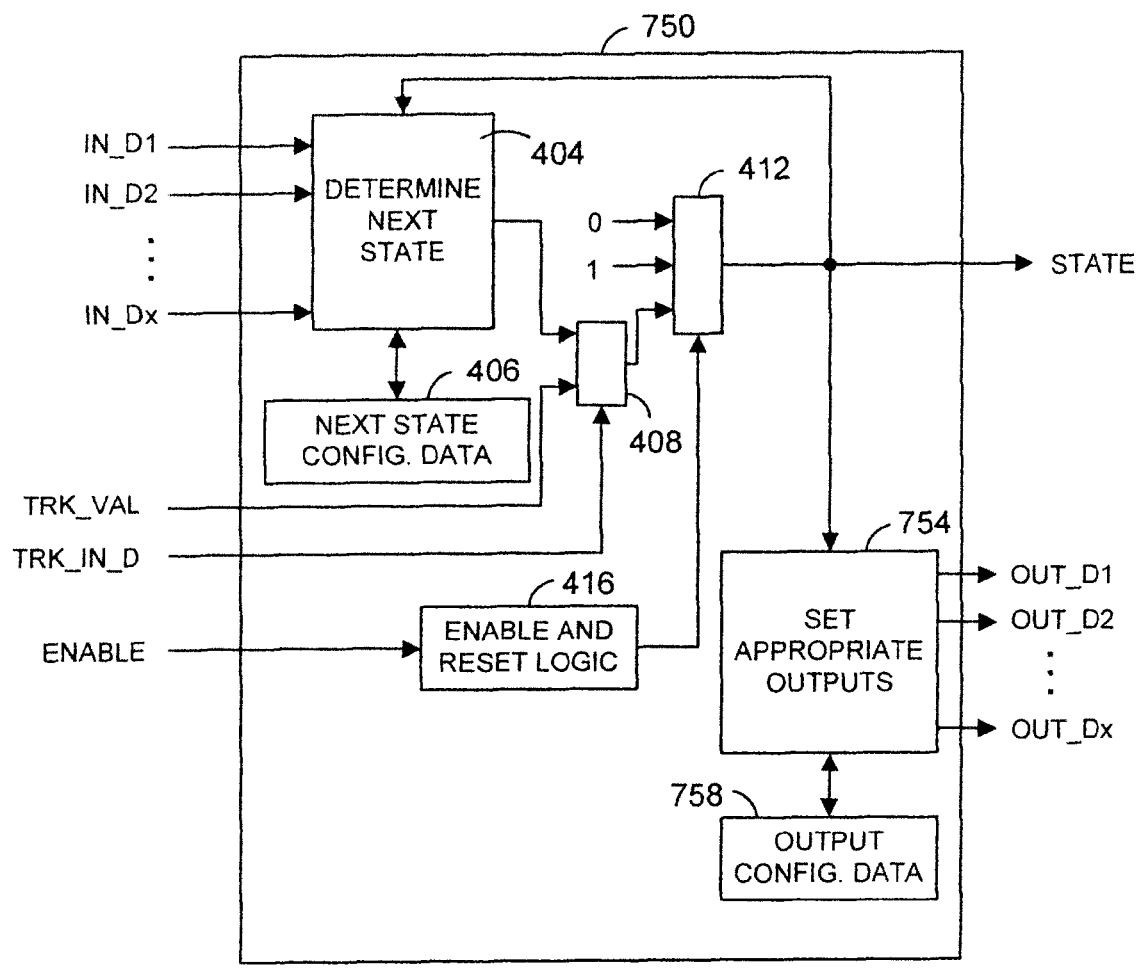
FIG. 14 is a block diagram of another example state machine function block.

Referring again to FIG. 7, and as described previously, after the current state has been determined at the block 362, the data outputs of the SMFB may be set based on the current state (block 366). For example, the data outputs may be set according to configuration data entered into a matrix such as the matrix 700 of FIG. 13. FIG. 14 is a block diagram of another example of a SMFB. The SMFB 750 is similar to the SMFB 400 of FIG. 8, but includes logic 754 that sets appropriate outputs OUT_D1, OUT_D2, etc., based on the current state of the state machine. In particular, the logic 754 accesses state/output configuration data stored in an output configuration database 758. The database 758 and the database 406 may be stored on a same computer readable medium or on different computer readable media. The output configuration data may comprise configuration data entered into a matrix such as the matrix 700 of FIG. 13.

Figure 15:
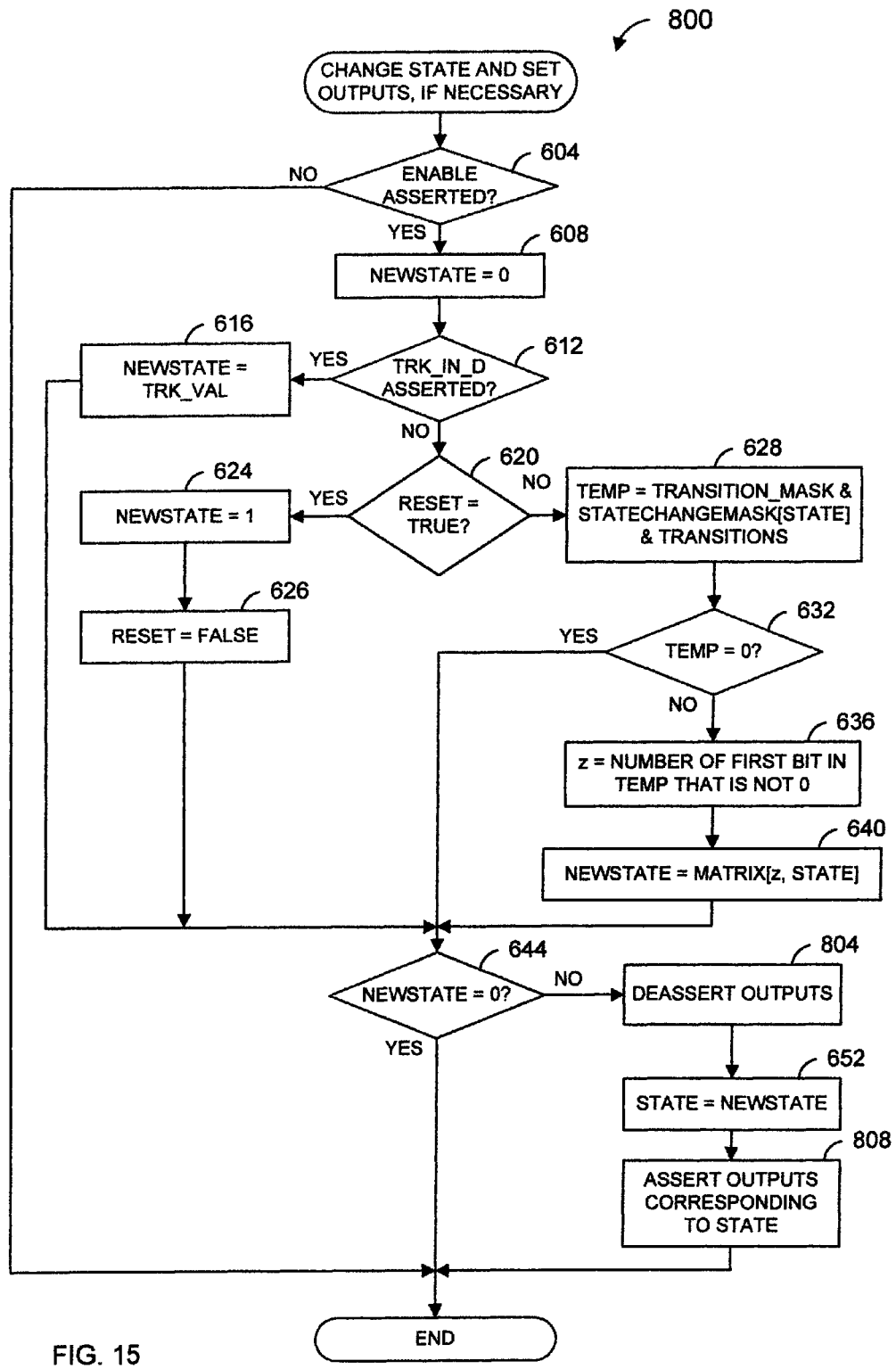
FIG. 15 is a flow diagram of another example routine for changing a state and setting outputs of a state machine function block.

FIG. 15 is a flow diagram of an example routine 800 that may be used to determine a next state of an SMFB and to assert appropriate outputs OUT_D1, OUT_D2, etc., if necessary. The routine 800 is similar to the routine 600 of FIG. 12. After the block 652, however, the flow proceeds to a block 804, which appropriate outputs OUT_D1, OUT_D2, etc., may be asserted.

Figure 16:
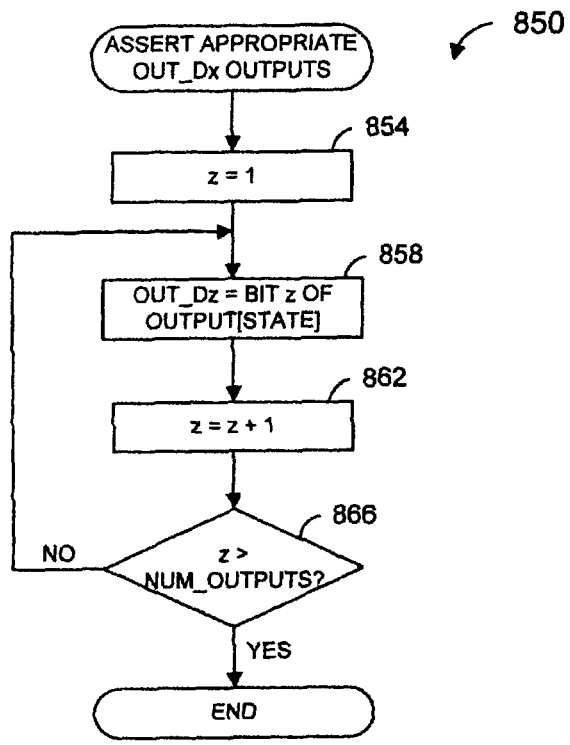
FIG. 16 is a flow diagram of an example routine for setting appropriate output values of a state machine function block.

FIG. 16 is a flow diagram of an example routine 850 that may be used to assert appropriate outputs OUT_D1, OUT_D2, etc. At a block 854, a variable z is set to one. At a block 858, the output OUT_Dz is set to the value of bit number z of an element of an array variable OUTPUT pointed to by the variable STATE. Each element of the OUTPUT array may be a variable that indicates, for a corresponding one of the states, the values of the outputs OUT_D1, OUT_D2, etc. For example OUTPUT[1] may correspond to state 1, OUTPUT[2] may correspond to state 2, etc. Additionally, each bit of each element may correspond to one of the outputs OUT_D1, OUT_D2, etc. For instance, bit 1 may correspond to OUT_D1, bit 2 may correspond to OUT_D2, etc. Referring to FIG. 13 for example, for the matrix 700 the OUTPUT array would have 6 elements, and the element OUTPUT[1] may be 0x06.

At a block 862, the variable z is incremented, and at a block 866 it may be determined if the value of z is greater than the number of outputs OUT_D1, OUT_D2, etc. If z is not greater than the number of outputs OUT_D1, OUT_D2, etc., the routine may proceed back to the block 858. Otherwise, the routine may end.

Figure 17:
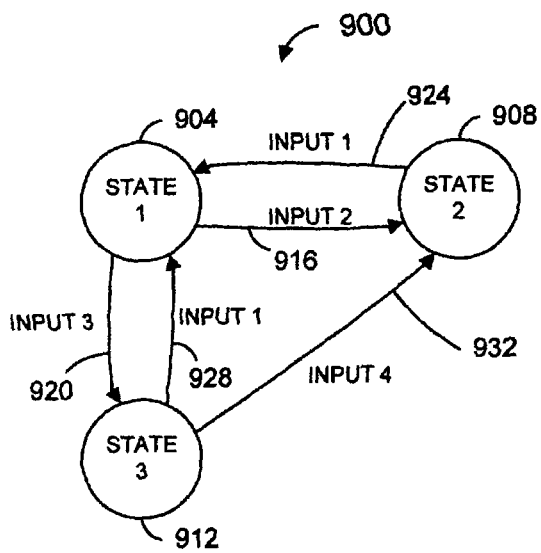
FIG. 17 is an example state transition diagram for entering next state configuration data for a state machine function block.

Configuration data for the SMFB may be entered via other types of graphical user interfaces in addition to those described above. For example, configuration data may be entered via a graphical user interface that is similar to a state transition diagram. FIG. 17 is an example state transition diagram 900 that could be used to configure a SMFB. The diagram 900 includes a plurality of graphical elements 904, 908, 912, 916, 920, 924, 928, and 932. Elements 904, 908, and 912 represent states 1, 2, and 3, respectively, of a state machine. Element 916 indicates that when the state machine is at state 1, it should transition to state 2 if INPUT 2 is asserted. Element 920 indicates that when the state machine is at state 1, it should transition to state 3 if INPUT 3 is asserted. Element 924 indicates that when the state machine is at state 2, it should transition to state 1 if INPUT 1 is asserted, and element 928 indicates that when the state machine is at state 3, it should transition to state 1 if INPUT 1 is asserted. Similarly, element 932 indicates that when the state machine is at state 3, it should transition to state 2 if INPUT 4 is asserted.

In general, an SMFB may be implemented by software, firmware, or hardware, or some combination of software, firmware, and/or hardware. For example, an SMFB may be implemented by one or more of the controllers 12a, 16a, I/O devices 24, logic solvers 50, and devices 22, 23, 60, 62. As another example, an SMFB may be implemented by one or more of the workstations 18a and 20a. For instance, the SMFB may be implemented by the workstation 18a and/or the workstation 20a as part of a simulation to test operation of the process plant or provide operator training. In some embodiments, the SMFB, may be implemented by a processor configured according to software, by a programmable logic device, e.g., a device including one or more of a gate array, a standard cell, a field programmable gate array (FPGA), a PROM, an EPROM, an EEPROM, a programmable array logic (PAL), a programmable logic array (PLA), etc.

Each of the blocks 404, 408, 412, 416, and 420 of FIG. 8 and the block 754 of FIG. 14 may be implemented by software, firmware, or hardware, or some combination of software, firmware, and/or hardware. Additionally, although the flow diagrams of FIGS. 10-12, 15, and 16 were described as routines, these flow diagrams could be implemented by software, hardware, firmware, or a combination of software, firmware, and/or hardware.

Embodiments of a user interface, such as the user interfaces described above, may be implemented, in whole or in part, by a processor, for example, configured according to a software program. For instance, the workstation 18a or 20a, or some other computer, may implement, in whole or in part, the above-described user interface. A software program for implementing embodiments of a user interface may be embodied in software stored on a tangible medium such as a hard disk, a RAM, a battery backed-up RAM, a ROM, a CD-ROM, a PROM, an EPROM, an EEPROM, a DVD, a flash memory, etc., or a memory, such as a RAM, associated with the processor, but persons of ordinary skill in the art will readily appreciate that the entire program or parts thereof could alternatively be executed by a device other than a processor, and/or embodied in firmware and/or dedicated hardware in a well known manner.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

The invention claimed is:

1. A function block entity for use in a process plant having a processor adapted to control, or to simulate control of, one or more field devices, the function block entity comprising:

a user modifiable state machine configuration database including state transition data indicative of how a state machine implemented by the function block is to transition among a plurality of states, wherein the state transition data comprises data for potential pairings of state machine states and one or more corresponding function block inputs, the state transition data indicative of a next state to which the state machine is to transition when the state machine is in a state corresponding to a particular one of the pairings and when the input corresponding to the particular one of the pairings is a particular value;

a first computer readable medium;

first code stored on the first computer readable medium to receive the inputs to the function block, wherein inputs comprise data associated with the process plant;

second code stored on the first computer readable medium to determine a next state of the state machine, wherein the determination is based on the at least one input, a current state of the state machine, and the state transition data, wherein the second code is fixed;

third code stored on the first computer readable medium to set the current state of the state machine to the next state, wherein the third code is fixed; and fourth code stored on the first computer readable medium to provide at least one function block output for use in controlling the one or more field devices.

2. A function block entity according to claim 1, wherein the state machine configuration database is stored on the first computer readable medium.

3. A function block entity according to claim 1, wherein the state machine configuration database is stored on a second computer readable medium different from the first computer readable medium.

4. A function block entity according to claim 1, wherein the one or more corresponding function block inputs comprise a plurality of inputs;
wherein the second code comprises fifth code stored on the first computer readable medium to determine the next state further based on priorities associated with the plurality of inputs.

5. A function block entity according to claim 4, wherein the fifth code comprises code to determine the next state further based on an order associated with the plurality of inputs.

6. A function block entity according to claim 1, further comprising:
fifth code stored on the first computer readable medium to determine whether a state transition is to occur based on at least one of the one or more corresponding function block inputs and the state transition data;
wherein the second code comprises code to determine the next state if a state transition is to occur; and
wherein the third code comprises code to set the current state of the state machine to the next state if a state transition is to occur.

7. A function block entity according to claim 1, wherein the second code comprises fifth code stored on the first computer readable medium to determine which, if any, of the inputs to the function block are the particular value.

8. A function block entity according to claim 7, wherein the second code further comprises sixth code stored on the first computer readable medium to determine which, if any, of the inputs to the function block are the particular value and which also correspond to a state change based, at least in part, on the state transition data.

9. A function block entity according to claim 8, further comprising seventh code stored on the first computer readable medium to select one, if any, of the inputs to the function block that are the particular value and that correspond to a state change, that corresponds to a state change from the current state.

10. A function block entity according to claim 9, wherein the one or more function block inputs comprise a plurality of inputs;
wherein the seventh code comprises eighth code stored on the first computer readable medium to select the one of the function block inputs based on priorities associated with the plurality of function block inputs.

11. A function block entity according to claim 10, wherein the eighth code comprises code to select one of the function block inputs of the plurality of function block inputs based on an order associated with the plurality of function block inputs.

12. A function block entity according to claim 1, wherein the second code comprises fifth code stored on the first computer readable medium to determine one or more, if any, of the one or more function block inputs that would cause a state change from the current state based on the state transition data stored on the second computer readable medium.

13. A function block entity according to claim 12, wherein the second code further comprises sixth code stored on the first computer readable medium to determine whether one or more, if any, of the one or more function block inputs that would cause a state change is also the particular value.

14. A function block entity according to claim 1, wherein the fourth code comprises fifth code stored on the first computer readable medium to provide a plurality of function block outputs.

15. A function block entity according to claim 14, wherein the fifth code comprises code to provide each of at least some of the plurality of function block outputs, wherein the at least some of the plurality or function block outputs are indicative of whether the current state of the state machine corresponds to a respective one of a plurality of possible states of the state machine.

16. A function block entity according to claim 14, wherein the fifth code comprises:
sixth code stored on the first computer readable medium to retrieve, based on at least the current state, data indicative of appropriate values for at least some of the plurality of state machine function block outputs from a user configurable output configuration database; and
seventh code stored on the first computer readable medium to set the at least some of the plurality of function block outputs to the appropriate values.

17. A function block entity according to claim 16, wherein the state machine configuration database and the output configuration database are stored on a same computer readable medium.

18. A function block entity according to claim 16, wherein the state machine configuration database and the output configuration database are stored on different computer readable media.

19. A function block entity according to claim 1, further comprising:
fifth code stored on the first computer readable medium to receive an input indicative of whether the state machine function block is to be disabled; and
sixth code stored on the first computer readable medium to set the current state of the state machine to a disabled state if the input indicative of whether the state machine function block is to be disabled indicates that the state machine function block is to be disabled.

20. A function block entity according to claim 1, further comprising:
fifth code stored on the first computer readable medium to receive an input indicative of whether the state machine function block is to be forced to an initial state; and
sixth code stored on the first computer readable medium to set the current state of the state machine to the initial state if the input indicative of whether the state machine function block is to be forced to the initial state indicates that the state machine function block should be forced to the initial state.

21. A function block entity according to claim 1, wherein the inputs to the function block comprise at least one signal associated with at least one of a process control system, a simulation of a process control system, a safety system, or a simulation of a safety system.

22. A function block entity according to claim 1, further comprising fifth code stored on the first computer readable medium to mask one or more, if any, of the inputs to the function block.

* * * * *